US011568117B2

(12) United States Patent
Rawat et al.

(10) Patent No.: US 11,568,117 B2
(45) Date of Patent: Jan. 31, 2023

(54) GENERATING SIMULATION-FRIENDLY COMPACT PHYSICAL MODELS FOR PASSIVE STRUCTURES

(71) Applicant: Synopsys, Inc., Mountain View, CA (US)

(72) Inventors: Surendra Singh Rawat, Karnataka (IN); Sunderarajan S. Mohan, Mountain View, CA (US)

(73) Assignee: SYNOPSYS, INC., Mountain View, CA (US)

(*) Notice: Subject to any disclaimer, the term of this patent is extended or adjusted under 35 U.S.C. 154(b) by 0 days.

(21) Appl. No.: 17/196,573

(22) Filed: Mar. 9, 2021

(65) Prior Publication Data

US 2021/0279395 A1    Sep. 9, 2021

(30) Foreign Application Priority Data

Mar. 9, 2020   (IN) .............................. 202041010079

(51) Int. Cl.
*G06F 30/30* (2020.01)
*G06F 30/373* (2020.01)
*G06F 30/367* (2020.01)
*G06F 111/04* (2020.01)

(52) U.S. Cl.
CPC .......... *G06F 30/373* (2020.01); *G06F 30/367* (2020.01); *G06F 2111/04* (2020.01)

(58) Field of Classification Search
CPC ... G06F 30/373; G06F 30/367; G06F 2111/04
See application file for complete search history.

(56) References Cited

U.S. PATENT DOCUMENTS

| 6,725,430 | B2* | 4/2004 | Draxler ................. G06F 30/36 716/137 |
| 9,471,731 | B2* | 10/2016 | Fu ............................ H02J 4/00 |
| 10,102,321 | B2* | 10/2018 | Povolny ................ G06F 30/367 |
| 10,621,265 | B2* | 4/2020 | Howald ................. G06F 17/11 |

* cited by examiner

*Primary Examiner* — Jack Chiang
*Assistant Examiner* — Brandon Bowers
(74) *Attorney, Agent, or Firm* — Lewis Roca Rothgerber Christie LLP

(57) ABSTRACT

A system and method for generating simulation-friendly compact physical models for passive structures is disclosed. The method includes generating an impedance map specifying impedances at a plurality of frequencies corresponding to one or more port-pairs of a circuit component using a processor to extract a plurality of impedance values between the one or more port-pairs based on a first value for each parameter of a plurality of parameters of the circuit component. The method includes generating a second circuit representation model based on updating the plurality of impedance values between the one or more port-pairs based on a second value for one or more parameters of the plurality of parameters of the circuit component, and updating the second circuit representation model by tuning the updated plurality of impedance values of the between the one or more port-pairs based on a predetermined use context of the circuit component in a circuit.

20 Claims, 10 Drawing Sheets

600

α: STEP SIZE $\beta_1, \beta_2$ : EXPONENTIAL DECAY RATES FOR THE MOMENT e\ESTIMATES $J(p)$ : OBJECTIVE FUNCTION WITH PARAMETERS p $p_0$: INITIAL PARAMETER VECTOR, ESTIMATED FROM FIRST STEP OF THE METHODOLOGY $m_0 \leftarrow 0$ (INITIALIZE FIRST MOMENT VECTOR)

$v_0 \leftarrow 0$ (INITIALIZE SECOND MOMENT VECTOR)

$i \leftarrow 0$ (INITIALIZE ITERATION)

WHILE $p_i$ NOT CONVERGED DO $i \leftarrow i + 1$ $grad_i \leftarrow \nabla_p J_i (p_{i-1})$ (Evaluation of gradient vector at iteration i)

$m_i \leftarrow \beta_1 \cdot m_{i-1} + (1 - \beta_1) \cdot grad_i$ (Update biased 1st moment estimate)

$v_i \leftarrow \beta_2 \cdot v_{i-1} + (1 - \beta_2) \cdot grad_i$ (Update biased 2nd moment estimate)

$\widehat{m_i} \leftarrow m_i/(1-\beta_1^i)$ (Eval biased corrected 1st moment estimate)

$\widehat{v_i}\ v_i/(1-\beta_2^i)$ (Eval biased corrected 2nd moment estimate)

$p_i \leftarrow p_{i-1} - \alpha \cdot \dfrac{m_i}{(\sqrt{v_i} + \epsilon = 10^{-8})}$

END WHILE

FIG. 6

GENERATING SIMULATION-FRIENDLY COMPACT PHYSICAL MODELS FOR PASSIVE STRUCTURES

RELATED APPLICATION

The present application claims priority under 35 U.S.C. § 119(a) Indian Patent Appl. No. 202041010079, filed on Mar. 9, 2020, which is incorporated herein by reference in its entirety for all purposes.

TECHNICAL FIELD

The present disclosure is generally related to electronic design and automation of an electrical circuit. In particular, the present disclosure is related to generating simulation-friendly compact physical models for passive structures used in the electrical circuit.

BACKGROUND

An extraction technology, e.g., electromagnetic extraction, can be used to generate physical and/or non-physical models for inductors, multi-tap coupled inductors including T-coils (three ports), and Q-coils (four ports), signal routes that require accurate radio frequency (RF) characterization, transmission lines, inductors adjacent to metal planes and lines, and other passive circuit structures using the layouts of such elements within a circuit, according to a first circuit representation model, for use in circuit simulation (e.g., Spice simulation) of the circuit. Such a model generated using an extraction technology may be hereinafter referred to as a source model. A source model is used to implement various simulations on circuits that includes these passive circuit structures. For example, the simulations may include transient simulation, alternating current (AC) simulations, and/or phase-noise simulations, etc.

However, a source model generated using such an extraction technology may be undesirable for simulation and may result in simulation failure (e.g., non-converging simulations, run-time crashes, and inaccurate simulation results), divergence and/or very long central processing unit (CPU) processing time because the source model has the following characteristics: (1) the source model is bulky due to full extraction, and, therefore, the source model is not suitable for long transient simulations; (2) the source model cannot be processed reliably by the simulator due to insufficient simulation points, non-physical impedance characteristics and frequency responses outside the frequency range used in the extraction; and (3) the source model has non-physical passive elements and/or ideal elements, negative capacitances, negative resistances and/or voltage-controlled-voltage-source (VCVS), and other controlled source elements.

SUMMARY

In one embodiment, a method is disclosed. The method is being performed by one or more processors. The method includes generating an impedance map specifying impedances at a plurality of frequencies corresponding to one or more port-pairs of a circuit component using a processor to extract a plurality of impedance values between the one or more port-pairs based on a first value for each parameter of a plurality of parameters of the circuit component. The one or more port-pairs and the plurality of frequencies corresponding to the one or more port-pairs are specified in a first circuit representation model. The method includes generating a second circuit representation model based on updating the plurality of impedance values between the one or more port-pairs based on a second value for one or more parameters of the plurality of parameters of the circuit component, and updating the second circuit representation model by tuning the updated plurality of impedance values between the one or more port-pairs based on a predetermined use context of the circuit component in a circuit.

In another embodiment, a system including a memory configured to store operations and one or more processors configured to perform the operations is disclosed. The operations include generating an impedance map specifying impedances at a plurality of frequencies corresponding to one or more port-pairs of a circuit component to extract a plurality of impedance values between the one or more port-pairs based on a first value for each parameter of a plurality of parameters of the circuit component. The one or more port-pairs and the plurality of frequencies corresponding to the one or more port-pairs are specified in a first circuit representation model. The operations further include generating a second circuit representation model based on updating the plurality of impedance values between the one or more port-pairs based on a second value for one or more parameters of the plurality of parameters of the circuit component, and updating the second circuit representation model by tuning the updated plurality of impedance values between the one or more port-pairs based on a predetermined use context of the circuit component in a circuit.

In yet another embodiment, a non-transitory, tangible computer-readable device having instructions stored thereon is disclosed. The instructions when executed by at least one computing device, cause the at least one computing device to perform operations, including The operations include generating an impedance map specifying impedances at a plurality of frequencies corresponding to one or more port-pairs of a circuit component to extract a plurality of impedance values between the one or more port-pairs based on a first value for each parameter of a plurality of parameters of the circuit component. The one or more port-pairs and the plurality of frequencies corresponding to the one or more port-pairs are specified in a first circuit representation model. The operations further include generating a second circuit representation model based on updating the plurality of impedance values between the one or more port-pairs based on a second value for one or more parameters of the plurality of parameters of the circuit component, and updating the second circuit representation model by tuning the updated plurality of impedance values between the one or more port-pairs based on a predetermined use context of the circuit component in a circuit.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 6 illustrates a method associated with the first step, in accordance with some embodiments.

Figure 1:
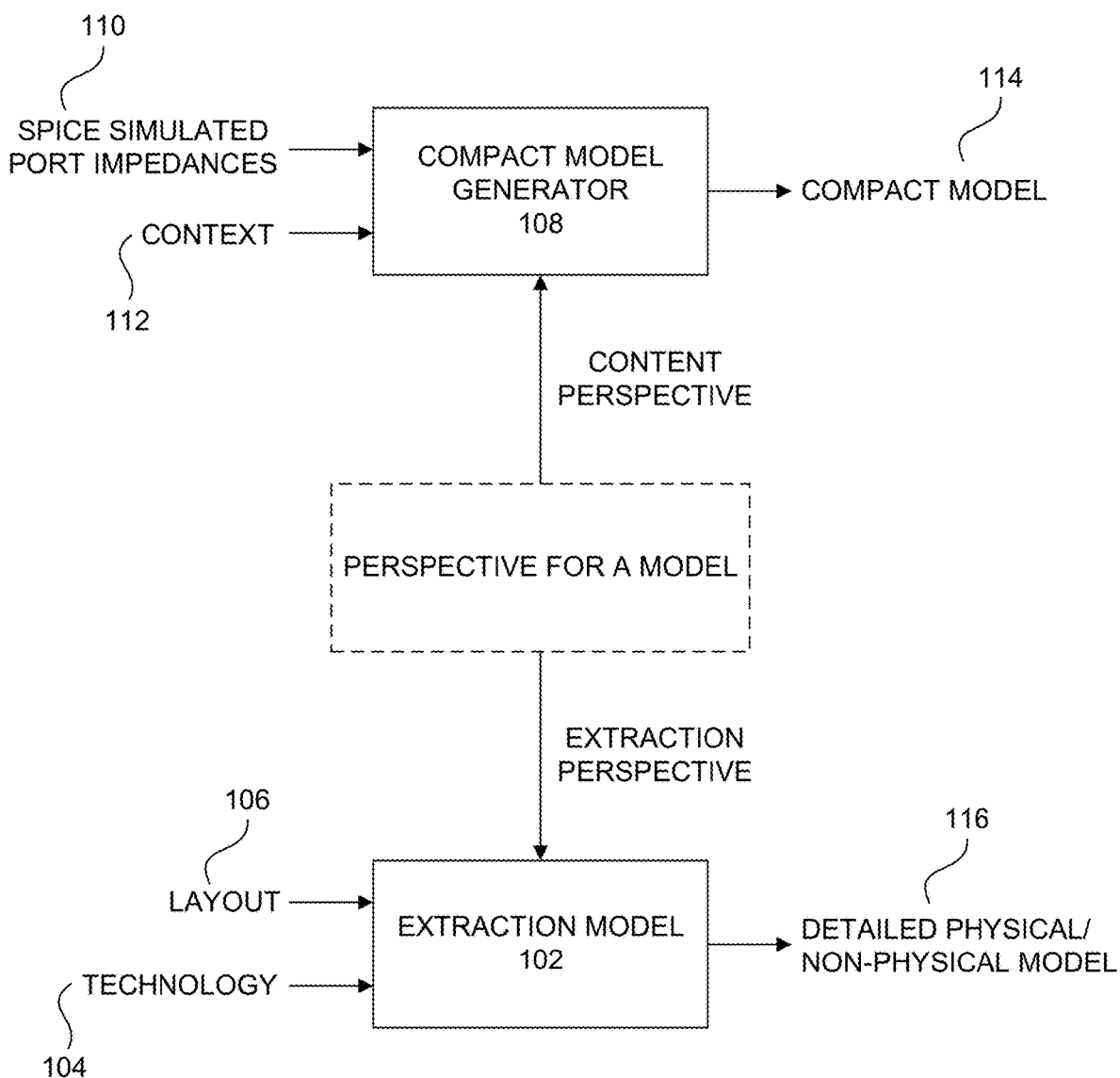
FIG. 1 illustrates a flow diagram of a compact model generator, in accordance with some embodiments.

To easily identify the discussion of any particular element or act, the most significant digit or digits in a reference number refer to the figure number in which that element is first introduced.

DETAILED DESCRIPTION

This present disclosure is describes a system and method for generating a compact physical model having only passive components of passive circuit structures (e.g., an inductor, a T-coil, a Q-coil, an RF-route, a multi-tap coupled inductor, a transmission line, and an inductor adjacent to metal planes and lines) based on optimizing parameters in a source model using a context netlist having a circuit configuration in which the passive circuit structure may be instantiated and loaded. A typical method for extracting a circuit simulation model for such a passive structure may apply a reduction technique to generate a circuit simulation model having non-physical or active components (e.g., vcvs) in addition to passive physical components. Since such active components do not exist in the passive structures, this leads to undesirable simulation results (e.g., non-converging simulations, run-time crashes, and inaccurate results) due to the active components.

A source model generated using a conventional extraction technology may be undesirable for simulation and may result in simulation failure (e.g., non-converging simulations, run-time crashes, and inaccurate simulation results), divergence and/or very long central processing unit (CPU) processing time in cases where the source model has the following characteristics: (1) the source model is bulky due to full extraction, and, therefore, the source model is not suitable for long transient simulations; (2) the source model cannot be processed reliably by the simulator due to insufficient simulation points, non-physical impedance characteristics and frequency responses outside the frequency range used in the extraction; and (3) the source model has non-physical passive elements and/or ideal elements, negative capacitances, negative resistances and/or voltage-controlled-voltage-source (VCVS), and other controlled source elements. In some embodiments, the present disclosure solves these limitations of the Inductor/T-coil/Q-coil/multi-tap coupled inductors/transmission lines/inductors adjacent to metal planes and lines source models. For example, the present disclosure describes a system and method for providing physical models that are desirable for simulation using a systematic multi-step methodology that ensures the full capture of the desired properties. This multi-step methodology can be explained and understood by the following steps:

(1) ensuring that low frequency resistance and inductance are preserved while transforming the source model;

(2) optimizing for the physical variables or parameters describing the model for an analytical framework to ensure good convergence on a variety of structures and impedance behaviors; and (3) using simulation-based optimization for refinements of the variables or parameters.

While the methodology is applied to inductors, T-coils, Q-coils, and other passive structures in the described examples, the scope of the present system and method is not limited to such examples. By way of a non-limiting example, the methodology can be applied to a model that includes a transmission line by modifying the transmission line parameters. Models generated using this methodology are compact, and are well-suited for complex spice simulations/analysis, system-level simulations, and longer transient simulations.

The present disclosure discloses a multi-step methodology of constructing a compact physical model for spiral inductors, T-coils, Q-coils, multi-tap coupled inductors, transmission lines and inductors adjacent to metal planes and lines and other passive structures from other conventional models (source models) such as s-parameter, RFM (rational function model), RLCK (R-resistance, L-inductance, C-capacitance and K-mutual inductance), or non-physical models. A typical model, as stated above, may be bulky due to full extraction and are therefore not suitable for long transient simulations. Non-convergence of such models in transient simulations may be due to, for example, insufficient simulation points, non-physical impedance characteristics and frequency responses outside the frequency range used in the extraction, non-physical passive elements and/or ideal-elements, negative capacitances, negative resistances, or VCVS-elements, as described in the Background section of this disclosure.

A method disclosed herein in accordance with some embodiments constructs a compact model or a second circuit representation model that overcomes these limitations. A multi-step process of the method ensures that the compact physical model generated produces simulation results, which are reliable and comparable or better than other models. Accordingly, the generated compact physical model may be more easily and speedily processed during simulation, and produce accurate simulation results. Further, due to convergence of the simulations being performed using the generated compact physical model, the number of crashes is reduced and the accuracy of the simulation results.

The present fully physical model generated from this methodology can be extended to system-level co-simulation environments.

FIG. 1 illustrates a flow diagram of a compact model generator to generate a compact model from the use context perspective, i.e., in the context of the circuit in which the generated model may be used, in accordance with some embodiments. An example of a use context perspective may include an LC oscillator, a bandwidth extension circuit, a resonator, or a part of a circuit that improves the return-loss. As shown in FIG. 1, an extraction model generator 102 takes as its input technology information 104 and a circuit layout information 106 to generate a physical or non-physical extraction model, i.e., a source model. Here, the technology information 104 may provide information about a process used for fabrication of the circuit, and the circuit layout information 106 may provide information about how various circuit components are connected to one another, their placement on the circuit, etc. As stated above, the output model 116 generated using the extraction model generator 102 may not be suitable for long transient simulations. Further, the generated output model 116, being bulky, may not be suitable for simulation (e.g., Spice simulation). The extraction model generator 102 is thus based on extraction perspective and therefore ignores the context in which the circuit is being used.

The compact model generator 108 takes use-context into consideration. It generates a compact model 114 based on the simulated port impedances 110 (e.g., based on Spice simulation) and context 112 which may include structure type information and its use-context, as specified above. The structure type information may include circuit components such as but not limited to inductors, T-coil, Q-coil, etc. The generated compact model 114, as described above, is desirable for simulation because of its smaller size. Thus, the compact model may be generated with a focus on retaining the accuracy that is desired at the frequency of interest while simplifying the model as much as possible to be amenable for the simulation and keeping the model physical and passive. Further, a model for simulation (e.g., Spice) is more reliable and robust if it is generated with context awareness as opposed to the extraction perspective.

Figure 2:
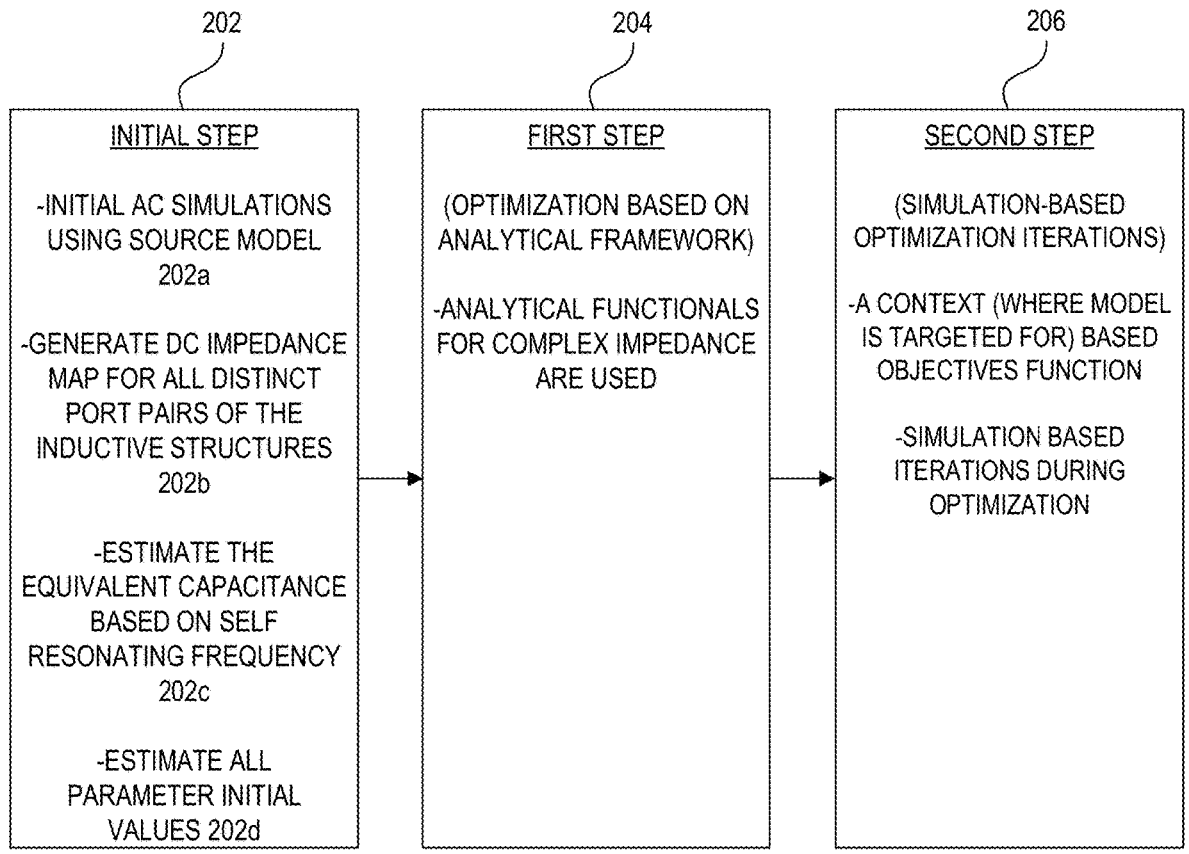
FIG. 2 illustrates a flow diagram of method steps of generating the compact model, in accordance with some embodiments.

FIG. 2 illustrates a flow diagram of method steps of generating the compact model, in accordance with some embodiments. As shown in FIG. 2, at 202, initial physical estimates of the parameters, e.g., impedances, are determined 202a by performing simulations using a source model. As described in detail below, a direct current (DC) impedance map for all distinct port pairs of inductive structures may be generated 202b. An example of a distinct port pair is described using FIG. 5 in which a port pair P1-P2 between ports P1 and P2 is shown. In addition, equivalent capacitance based on self-resonating frequency may also be estimated 202c. At the initial step 202, initial values for various simulation parameters may be estimated 202d. Different values of the simulation parameters may generate a different circuit configuration.

In the first step 204, parameters of a compact model are optimized based on an analytical framework. Analytical functions, as described in detail below, may be used for optimization based on the impedance map generated at the step 202. In the second step 206, simulation-based optimization-iterations are performed to refine the parameters of the compact model. At this step, objective functions based on the context in which the model is being used may be used for optimization.

Figure 3:
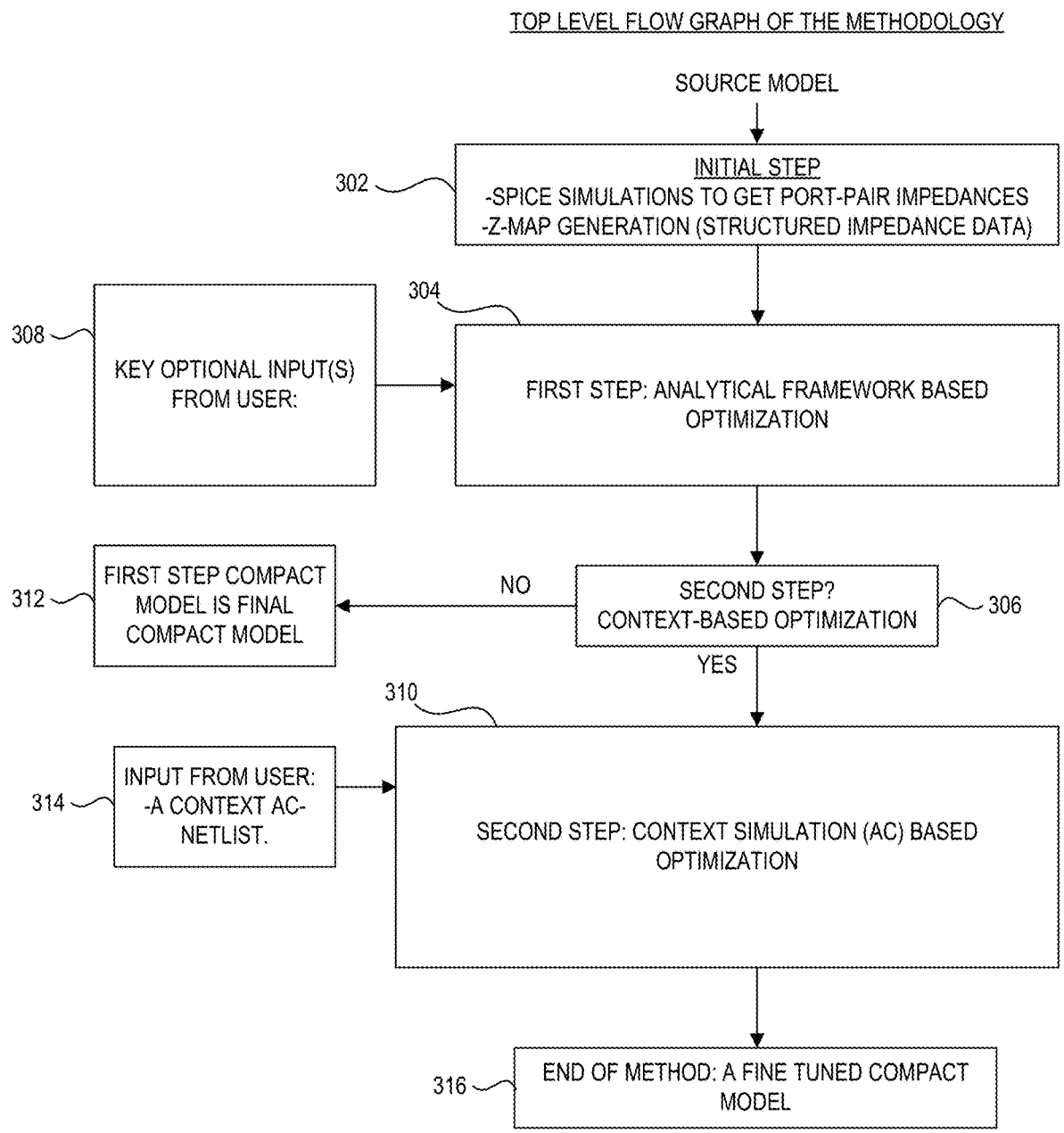
FIG. 3 is a top-level flow graph of the methodology capturing the main processes in this multi-step method, in accordance with some embodiments.

FIG. 3 is a top-level flow graph of the methodology capturing the main processes in this multi-step method, in accordance with some embodiments. In the next sections, this methodology is discussed in detail with section (I) 302 describing the initial step in which initial values of the parameters are estimated, and a DC impedance map is created, Section (II) 304 describing the first step, which is an analytical framework, and Section (III) 310 describing the simulation-based optimization as a next step, and the last section (IV) describing benchmarking quality and reliability. While these sections are described separately to aid in understanding, one skilled in the relevant arts will appreciate that the concepts described in a given section may be carried out in other steps and orderings, and need not be performed rigidly as described by way of non-limiting example.

Section (I)—Initial Step

In accordance with some embodiments, at the initial step 302, the AC-impedances, from low frequency to the maximum frequency of interest, of relevant port-pairs are simulated. A DC-impedance map is generated based on the AC-impedances of the relevant port-pairs. The DC-impedance map, which may also be referenced as a Z-map, which specifies the impedances between a plurality of port-pairs at the frequencies of interest may also be generated.

In some embodiments, by way of a non-limiting example, an electromagnetic (EM) extraction tool may operate on a layout of a passive structure, such as an inductor, T-coil, RF route, multi-tap coupled inductors, transmission lines and inductors adjacent to metal planes and lines to obtain a netlist that represents the behavior of the physical structure as a function of frequency. This netlist may be referred to herein as the source model. While the (AC) Spice simulation for this starting source model is desirable for simulation, properties that make this source model undesirable for simulation are mostly associated with large signal analysis and get exposed when additional test scenarios, for example, test suites including phase-noise analysis, transient noise analysis, etc. that include '.tran', '.phasenoise' and other complex analysis statements of simulations, for example, Spice simulations, are invoked.

Section (II)—First Step

Figure 4:
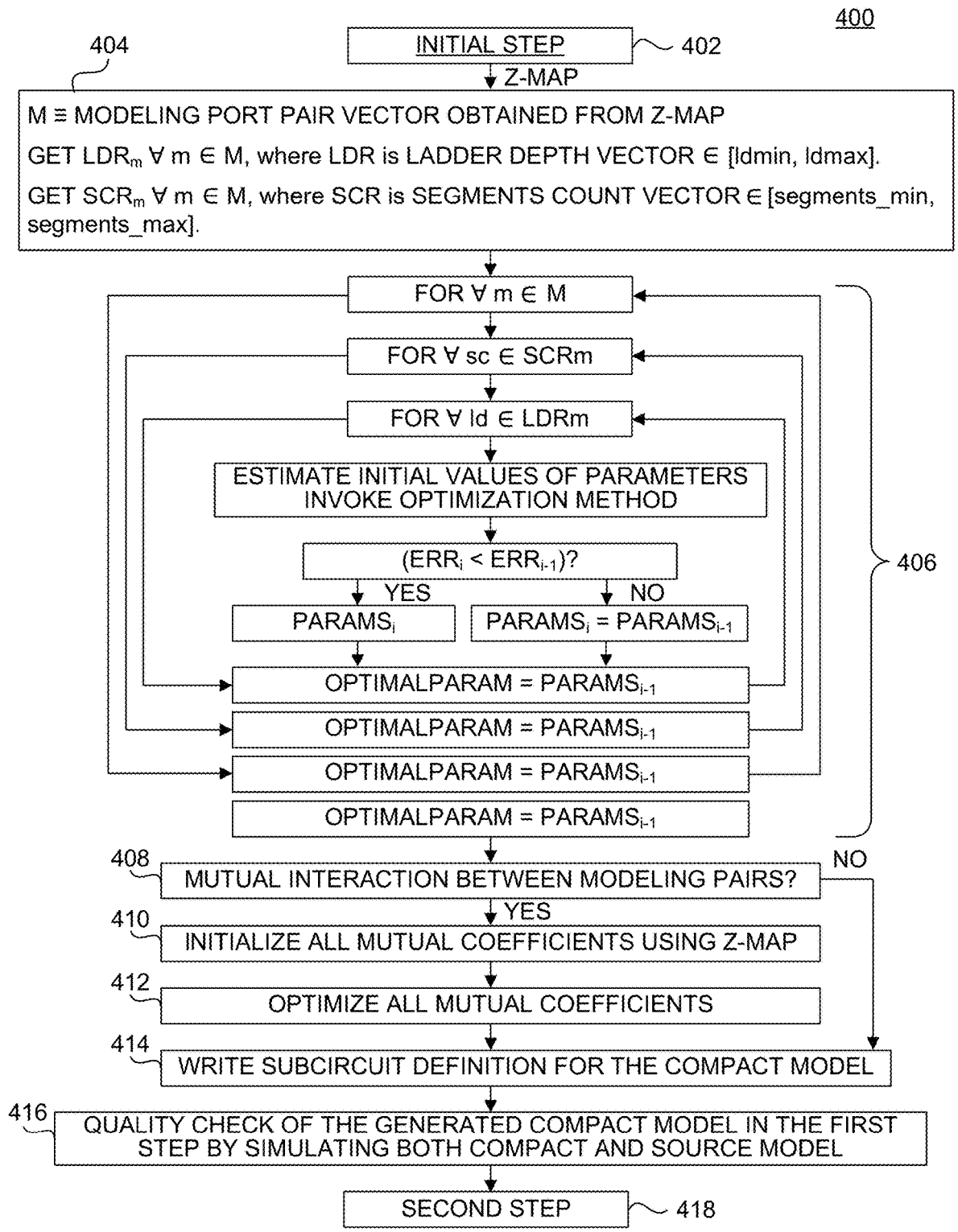
FIG. 4 illustrates a first step in detail, in accordance with some embodiments.
Figure 5:
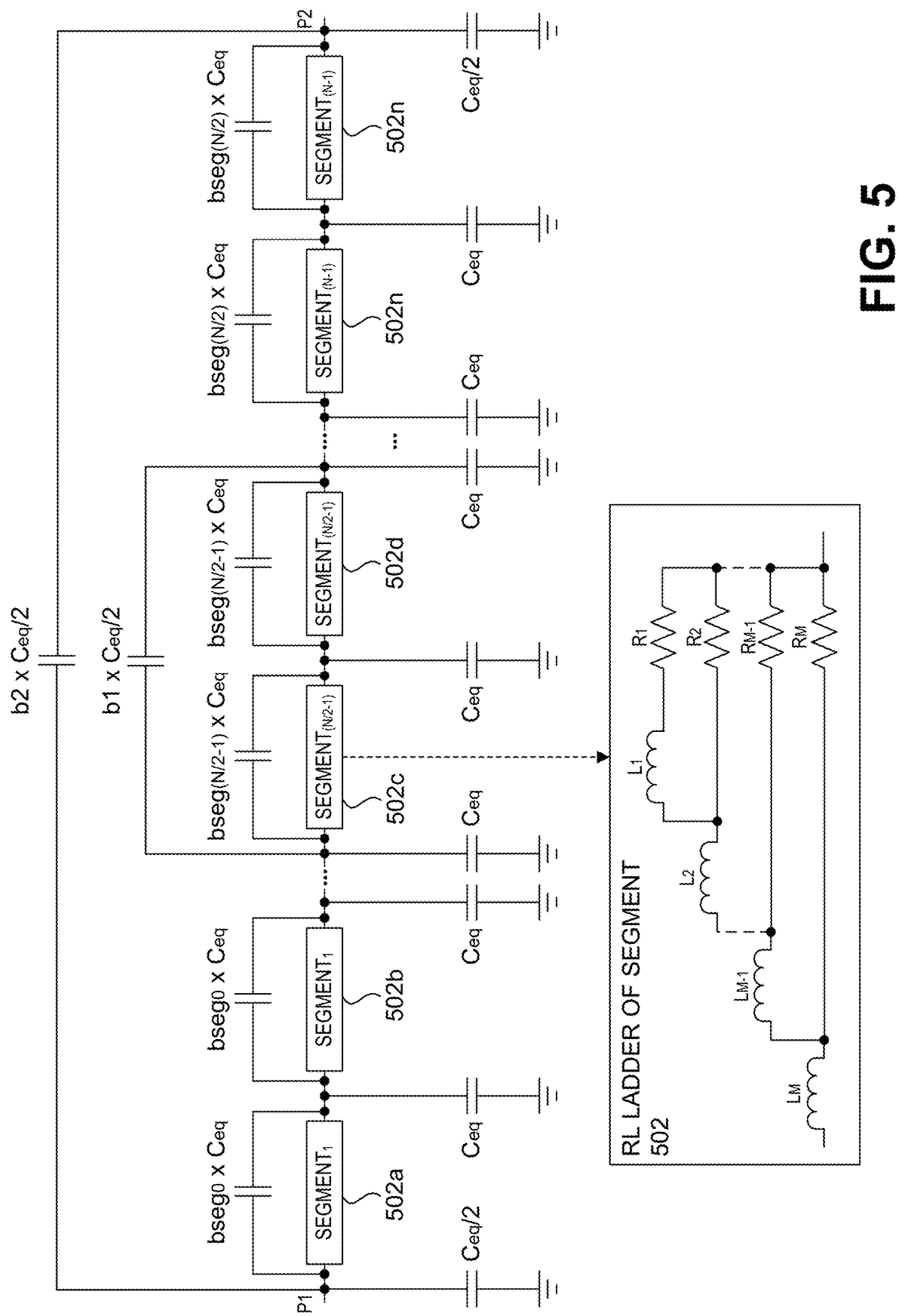
FIG. 5 is a diagram of a compact circuit network used for modeling the impedance between a port-pair describing the analytical framework for the first step, in accordance with some embodiments.

The flow graph for the first step 304 is shown in detail in FIG. 4. The initial analytical values are estimated from the Z-map generated in the initial step for the parameters (R, L, C, K) describing the compact circuit network as shown in FIG. 5. This compact circuit network is accounted to capture the various types of impedances from low frequency to very high frequency. As shown in FIG. 3, at the first step 304, by way of a non-limiting example, additional input 308 may be received from a user. The additional input 308 may include structure-type information. The structure type information may include information of an inductor, a T-coil, a Q-coil, multi-tap coupled inductors, transmission lines and inductors adjacent to metal planes and lines etc. The additional input 308 may also include frequency ranges for a plurality of components of the structure. The additional input 308 may also include a ladder depth range to be discussed below, a section count range, information about the symmetrical nature of the structure, and/or enabling of bypass/bridge capacitance optimization, etc. Based on the additional input 308, at the first step 304, self-resonance frequency of the structure, resistance (R), and inductance (L) parameters of a ladder structure may be estimated. At the first step 304, analytical framework-based optimization may be restrained to ensure the correctness of DC-impedance using the linear algebraic equations describing the DC resistance between each port-pair of the plurality of port-pairs. By way of a non-limiting example, a subset of parameters may be selected for the analytical framework-based optimization. Further, the optimization method used at the first step 304 may be configurable. By way of a non-limiting example, a specific gradient descent method may be used for optimization.

As shown in FIG. 3, the second step 310 may be performed if context-based optimization is enabled by a user, as shown at step 306. If the context-based optimization is not enabled, then a model generated after the first step 304, which is a compact model, is the final compact model 312. Otherwise, the compact model generated at the first step 304 is further optimized based on the context in which the structure is being used. At this second step 310, parameter values of a plurality of optimization parameters as determined at the first step 304 may be considered as initial values for the plurality of optimization parameters. A predetermined number of iterations may be performed to determine context-based fine-tuned optimal values of the plurality of parameters. At this step 310, DC impedance construction may also be corrected by the context-based optimization. For example, for the AC simulation for the context-based optimization, DC frequency points may also be included in the frequency plan describing the frequencies to be simulated. As a result, a fine-tuned compact model may be generated at the end of the step 310. By way of a non-limiting example, a netlist information according to a predetermined use context 314 may be provided for the context-based optimization. An output generated at 310 is a fine-tuned compact model 316, which as stated above is better suitable for simulation, for example, Spice simulation. In one example of the predetermined use context, a context netlist may be provided that describes a circuit configuration in which the passive structure under consideration may be instantiated and loaded according to the given application requirements.

FIG. 4 illustrates a first step in detail, in accordance with some embodiments. As shown in FIG. 4 and as described above, a DC-impedance map (Z-map) is generated during an initial step 402, which is similar to step 302 described above using FIG. 3. The Z-map 404 may include a vector of a plurality of port-pairs (M) of a structure, a ladder depth vector ($LDR_m$) where m is an element of the M. The $LDR_m$ may have a predetermined minimum and a maximum number of rungs, for example, $LD_{min}$ and $LD_{max}$, respectively. The Z-map 404 may also include a segment count vector ($SCR_m$), which may have a minimum segment and a maximum segment, for example, segments_min and segments_max, respectively.

In accordance with some embodiments, at step 406, for each port-pair of the M, for each rung of the $LDR_m$, and each segment of the $SCR_m$, initial values of parameters may be estimated prior to invoking an optimization method. During the optimization method, a predetermined number of iterations may be performed, and at each iteration, an output value, for example, an optimization error value of the iteration i, may be compared against an optimization error value of an earlier iteration. If the optimization error value of the iteration is smaller than the optimization error value of the earlier iteration, the parameter value may be set based on the iteration i. Otherwise, the parameter value may be set based on the iteration i-1.

In accordance with some embodiments, at step 408, a mutual interaction between port-pairs of the M may be analyzed. The mutual interaction between port-pairs may be due to magnetic flux linkage between port-pairs, which may be referenced in this disclosure as mutual inductance. If no mutual interaction is found between port-pairs of the M, then subcircuit definition may be written for the compact model, as shown in FIG. 4 as 414, which is described in detail below. However, if mutual interaction is found between port-pairs of the M, then mutual inductance coefficients for the Z-map may be initialized and optimized, as shown in FIG. 4 as 410 and 412, respectively. At 416, a quality check may be performed, for example, by comparing the AC simulation accuracy of the source model and the generated compact model, before moving to the second step 418, which is described above with reference to FIG. 3.

FIG. 5 is a diagram of a compact circuit network used for modeling the impedance between a port-pair describing the analytical framework for the first step, in accordance with some embodiments. Although FIG. 5 shows an resistor-inductance (RL) ladder structure, for example, an RL ladder structure 502 in each segment, it is understood that other generic structures can be used in other embodiments. In accordance with some embodiments, the resistors, inductors, and capacitors of the compact circuit network of FIG. 5 can fit a wide variety of passive structures, such as T-coil, Q-coil, multi-tap coupled inductors, transmission lines and inductors adjacent to metal planes and lines structures. The compact circuit network model of the first step is advantageously compact, physical, i.e., has a limited count of physical elements to be tuned, and simple.

In FIG. 5, N represents the number of segments used in the compact circuit network (e.g., N=1, 2, 3, 4, . . . ), M represents the depth of the RL ladder structure used in the compact circuit network (e.g., M=1, 2, 3, . . . ) and $C_{eq}$ is the equivalent capacitance. By way of a non-limiting example, segments 502a, 502b, . . . , 502n are shown in FIG. 5. The values b1 and b2 are fractions of $C_{eq}$ for the bridge-to-bridge capacitances, as illustrated. The values $bseg_0$-$bseg_{(N-1)}$, are fractions of $C_{eq}$ for bypass capacitances across the segments, $segment_1$-$segment_N$, respectively.

In FIG. 5, one port-pair of the plurality of port-pairs is shown. The port-pair shown in FIG. 5 includes ports P1 and P2. The impedance between the ports $P_1$ and $P_2$ of the port-pair of the compact circuit network of FIG. 5 may be represented as follows:

$$Z_{p1\text{-}p2} = f_r(L_1, L_2, \ldots L_{M-1}, L_0, R_1, R_2, \ldots R_M, b1, b2, bseg0, bseg1, bseg_{(N-1)}, C_{eq}) + if_i(L_1, L_2, \ldots L_{M-1}, L_0, R_1, R_2, \ldots R_M, b1, b2, bseg0, bseg1, bseg_{(N-1)}, C_{eq})$$

wherein $f_r$ and $f_i$ are the closed form functions for real and imaginary (i) parts of the impedance, respectively. These functions provide the analytic framework for the first step. Note that a total of (2M+N+3) optimization parameters define the impedance between one pair of ports ($P_1$ and $P_2$).

In the first step, the optimized values of the circuit parameters initialized in the initial step are obtained using, for example, the gradient descent algorithm, for which the objective function J, is evaluated in every iteration using the analytical expression for the impedance for the compact circuit network as shown in FIG. 5. The objective function for a port-pair used in the analytical framework based first step optimization is:

$$J = \tfrac{1}{2} \tfrac{1}{2} \Sigma_0^{L-1}(f_r - z_r)^2 + \tfrac{1}{2} \Sigma_0^{L-1}(f_i - z_i)^2 \qquad \text{Eq. (1)}$$

where L is the number of frequency points, $f_r$ and $f_i$ are the analytical functions, real and imaginary parts, respectively, for the impedance of the network shown in FIG. 5, $z_r$ and $z_i$ are the real and imaginary parts of the ac impedance, for example, from Spice simulation, between the relevant port-pair using the original model, and the optimization problem is:

$$\min_p J(p) \qquad \text{Eq. (2)}$$

where p is a parameter vector having the compact circuit parameters described in FIG. 5 as its components.

FIG. 6 illustrates a method associated with the first step, in accordance with some embodiments. By way of a non-limiting example, an algorithm 600 is shown which uses a gradient-based optimization method. The gradient is evaluated using the impedance functions as shown in FIG. 5. Although FIG. 6 illustrates a particular optimization method, it is understood that other optimization methods can be used in other embodiments. As shown in FIG. 6, the "while" loop will end when there is no difference between parameter values between an iteration i and an iteration i−1.

In accordance with some embodiments, the first step constructs a physical model based on the objective function as shown in Eq. (1) using gradient-based optimization with optimal values of the segments, ladder-depth, resistances, and capacitances for the network shown in FIG. 5. This is done for all the relevant port-pairs of an inductor/T-coil/multi-tap coupled inductors/transmission lines/inductors adjacent to metal planes and lines structure under consideration. When mutual inductances are present among port-pairs, the mutual coefficients are also optimized in the first step. As stated above, the output model of the first step model is the input to the second step.

As described above, the first step starts with a template for the compact circuit network, e.g., the template of FIG. 5, and the circuit elements in this template are the variables (or parameters) being optimized. FIG. 5 shows a generic template having N segments and ladder depth of M for each segment. The template class is defined by the N and M values. For this template class, there are a total of (2M+N+3) optimization values, namely: $L_1, L_2, \ldots, L_{(M-1)}, L_0$ (M inductances), $R_1, R_2, \ldots R_M$ (M resistances), b1, b2 (2 bridge capacitance coefficients) and $C_{eq}$ (1 equivalent capacitance).

So, for a given N and M total, (2M+N+3) optimization variables are optimized in the first step. During the first step, iterations sweep M and N, and the best result is chosen among these optimization sweeps. The passive physical structures for the current fabrication technologies for the top-level metal layers is such that varying a value of M, for example, between 2 and 5 (i.e., M=2, 3, 4, 5), and varying a value of N, for example, between 2 and 6 with an even step (i.e., N=2, 4, 6) is most likely to provide optimal values for M and N. However, other sweep ranges/values can be used in other embodiments. In some embodiments, machine learning-based clustering may be used to determine M and N.

In FIG. 4, at 414, a subcircuit definition for the compact model is determined based on generating a compact model, for example, in Spice language, for the best template class with the corresponding number of optimized variables assigned to the fields, for example, total in 2M+N+3. This step writes the connectivity among the circuit elements, for example, a netlist that describes connectivity between circuit elements in spice syntax. By way of a non-limiting example, the best template class may be determined by comparing the impedance of the circuit network modeled for a port-pair with the impedance of the circuit network modeled for the port-pair based on the source model for various ladder depths and segment counts.

The (2M+N+3) optimization variable count is an exhaustive or a maximum count.

Based on the type of the passive structure or layout, some of these optimization variables can be removed by optional arguments. For example, in a symmetric structure with no bypass capacitance effect at higher frequencies, the bridge-capacitance coefficients (b1, b2) and bypass capacitance coefficients ($bseg_0$-$bseg_{(N-1)}$) can be left out of the optimization.

While the above description is for inductors, the same is true for other passive structures where the mutual inductances are present between the port-pairs due to their physical proximities, with additional mutual coefficients as optimization variables. For example, if a differential T-coil requires a total of four-port pairs to be modeled, then there would be six mutual coefficients that also get optimized.

III. Second Step: Simulation-Based Optimization

Figure 7:
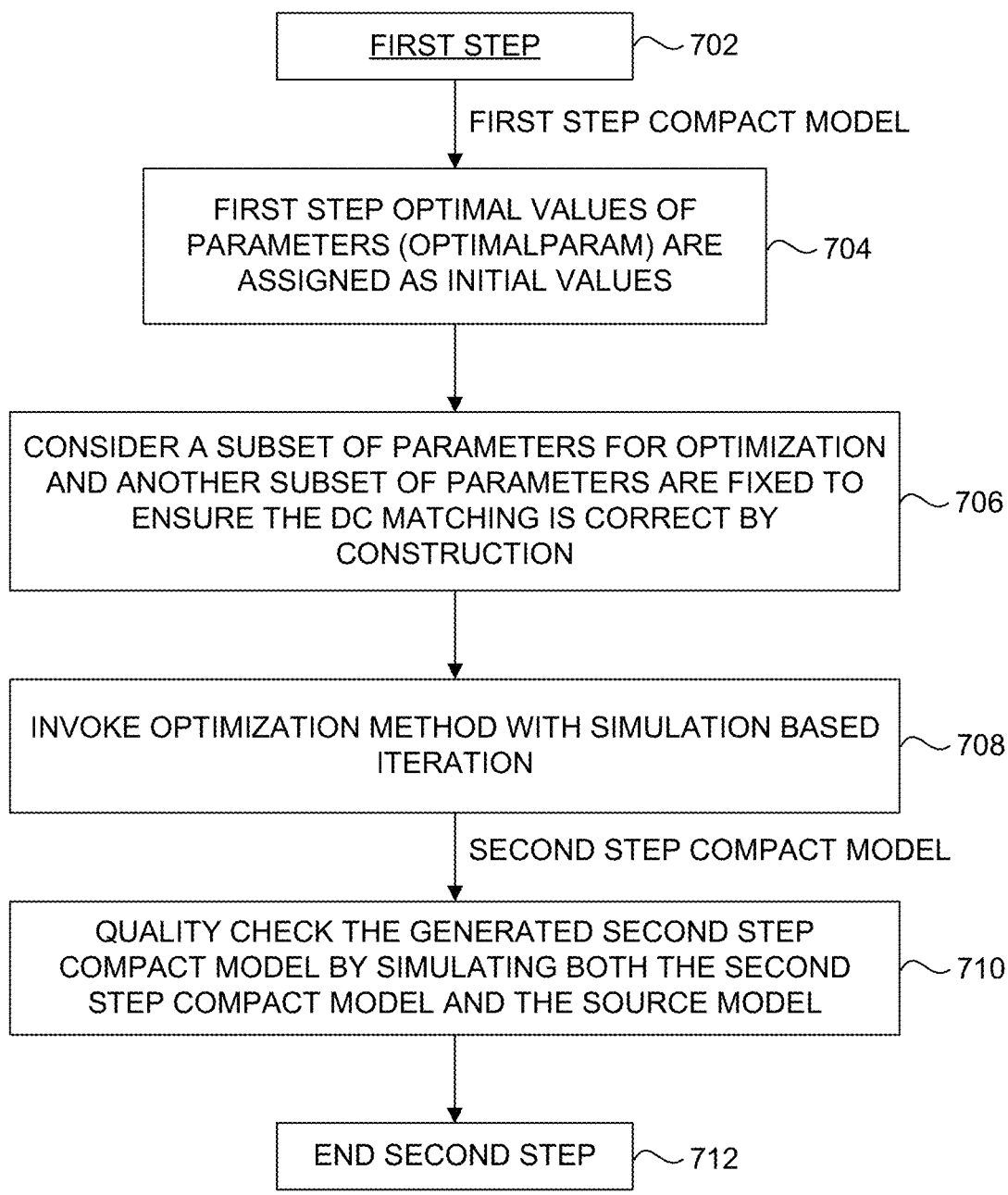
FIG. 7 illustrates a top-level flow graph for a second step, in accordance with some embodiments.

FIG. 7 illustrates a top-level flow graph for the second step, i.e., context simulation-based optimization. At 702, an output of the first step, for example, a model for the circuit component, according to some embodiments as described herein is generated. The generated model for the circuit component is fed as an input for the second step. At step 704, parameters received from the user are initialized. The plurality of parameters may be initialized with the same values as chosen at the first step, as described herein in accordance with some embodiments. At 706, a subset of the plurality of parameters is selected for optimization, and another subset of the plurality of parameters' values is kept unchanged. Accordingly, it can be determined an effect of the selected subset of the plurality of parameters when the circuit component is an evaluation with reference to the predetermined use context of the circuit to which the circuit component belongs or is coupled.

By way of a non-limiting example, the predetermined use context may be an application netlist in which the compact model under consideration is instantiated and connected to various loads as per application or requirement. At 708, the context netlist is simulated such that all the dynamics and physics of the passive device under consideration come into action. Specifically, the physical effects, which are difficult to express in analytical form because the first step of the methodology is an analytical framework, and parameters are optimized for an analytical objective(s), are optimized according to the predetermined use context. Such physical effects include intra-coil mutual flux, inter-coil mutual flux, eddy-currents, and load-dependent impedance variation. The context-based second step optimizes the parameters for such non-analytical physical effects. By way of a non-limiting example, the a specific configuration for the passive device (model) under consideration may not be required. There can be multiple instantiations of the passive device in the context netlist.

In some embodiments, by way of a non-limiting example, 'context' refers to the circuitry outside of the model being optimized. For example, if the inductor being modeled is used in an LC oscillator; transistors, coarse-tuning capacitors, and fine-tuning capacitors may be coupled to the inductor to form a circuit that oscillates within a desired frequency range. However, for purposes of model optimization, the full-blown context circuit is not required. Rather, an equivalent linearized simplification is used so that the correct ports of the inductor and the desired frequency ranges are given prominence in the fitting of the context-based model. The linearized simplification of the actual context makes iterations faster (due to faster and easy handling of the context-netlist in the simulation iterations).

As stated above, the input model for the second step is the optimized compact model from the first step 702. The objective function for the second step constitutes the quantities, which are probed in the context ac netlist. The objective function describes a criterion for probing inside the netlist. For example, the criterion may be a magnitude and/or a phase of an AC voltage at a particular node and/or a combination of physical and/or virtual ports of various nodes of the netlist. At 708, the objective function in every simulation iteration is evaluated using, for example, the Spice AC simulation, in contrast to the first step where its objective function is evaluated using an analytical expression for the impedance between the port-pairs. Accordingly, the objective functions for the first step and second step are different. For the first step 702, the objective function is process-determined, while in the second step, the objective function is constructed from the probed quantities, which the user can decide in the context netlist. Accordingly, this allows the fine-tuning of the parameters to their most optimal value, which could not be obtained due to the effects and physical behavior, which is present in the context and could not be captured in the first step objective function due to their non-analytical nature.

By way of a non-limiting example, the second step optimization can be done in either of these two different methods (i) Gradient descent method (ii) Simplex method. By way of a non-limiting example, various application programming interface (API), such as the H-Spice-Python API may be integrated as an optional feature to perform the second step's simulation iterations, which allows the various other python optimization routines to perform the optimization problem of fine-tuning the parameters in a context. In other embodiments, second step optimization can be performed using different methods.

Note that the second step can be run on a testbench that is much simpler (and faster) than a full testbench. In another example, an analog front end (AFE) in serializer-deserializer (SerDes) has more than 10 complicated inductor models. In this example, the second step requires the creation of a simplified linear ac testbench for each inductor model separately so that overall, the parameter fine-tuning is fast.

At 710, a quality check may be performed by simulating the generated compact model at 708 and the source model and comparing their outputs. Outputs are based on the probed quantities in the netlist. Based on the comparison, the generated compact model may be either determined to be the final compact model for use in simulation at 712 or further optimized if there is a deviation in the results beyond a threshold value.

IV. Benchmarking (Quality and Reliability):

The multi-step compact model generation from the original model is a technique, which overcomes the difficulties faced with the original (source) model when used in transient simulations, phase noise simulations, and system-level simulations. The initial step ensures that during the transformation, low-frequency impedances between the port pairs are preserved. The first and second step optimization processes get the compact circuit's parameters to the values, which ensure the quality and reliability of the compact model. A full set of regression was run thoroughly for the inductor, T-coil, Q-coil, multi-tap coupled inductors, transmission lines and inductors adjacent to metal planes and lines cases to benchmark this multi-step technique. This regression suite contains cases over the wide range of maximum fitting frequencies up to 10 GHz-50 GHz. Many of these models are already being used in simulations where the original models had convergence issues.

Figure 8:
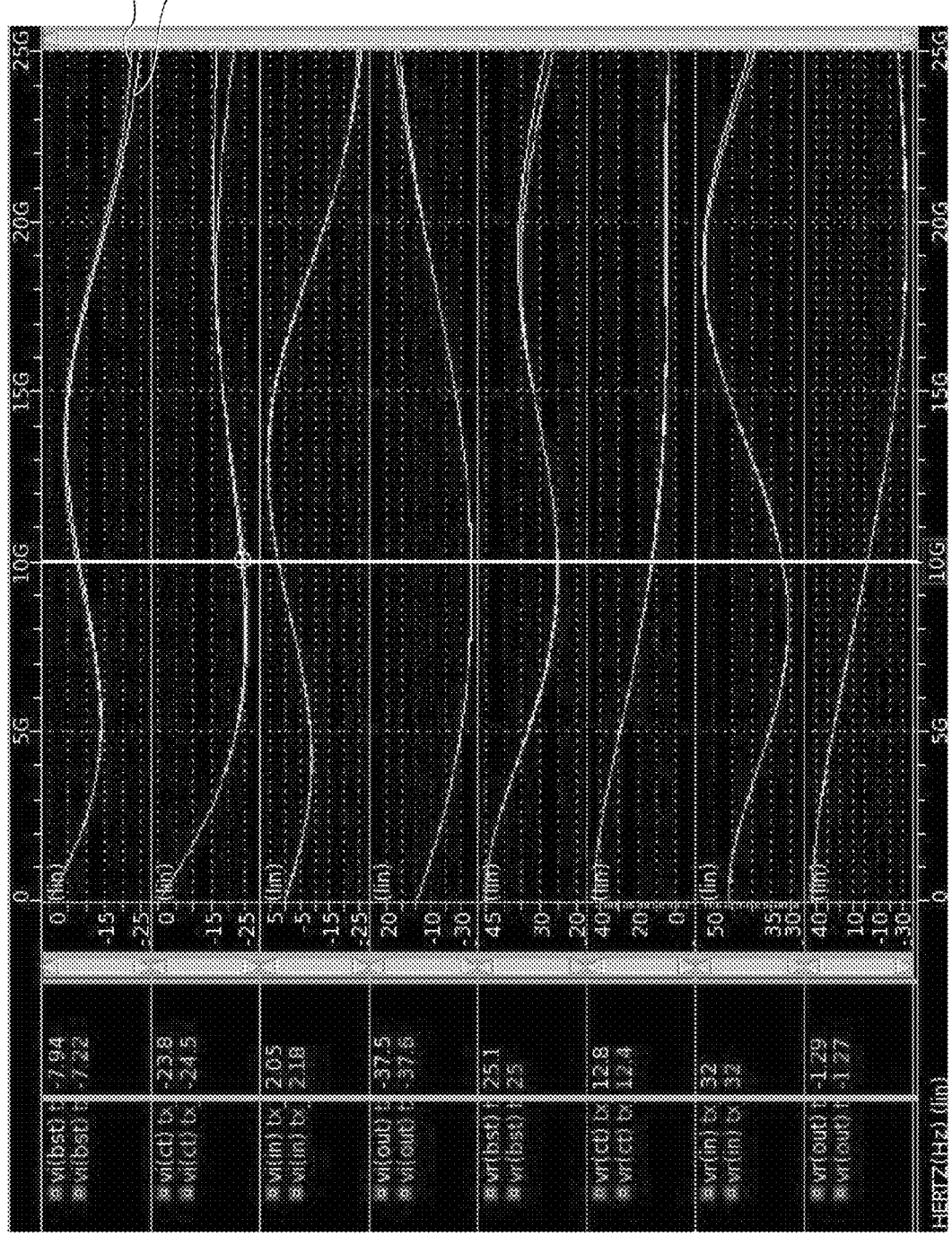
FIG. 8 illustrates spice simulation comparison of the source model of Q-coil and corresponding compact model, in accordance with some embodiments.

FIG. 8 illustrates the spice simulation comparison of the source model of Q-coil 804 and corresponding compact model 802 generated from this methodology. In FIG. 8, x axis represents frequency and y axis represents impedance. The plot shows the real (vr) and imaginary (vi) parts of the probed quantities in the used context netlist.

The optimization target is that the compact model parameters obtained from the first step should be fine-tuned such that error in all the probed quantities should be minimal when simulated using the compact model and when simulated using the source model, e.g., an extraction model.

Figure 9:
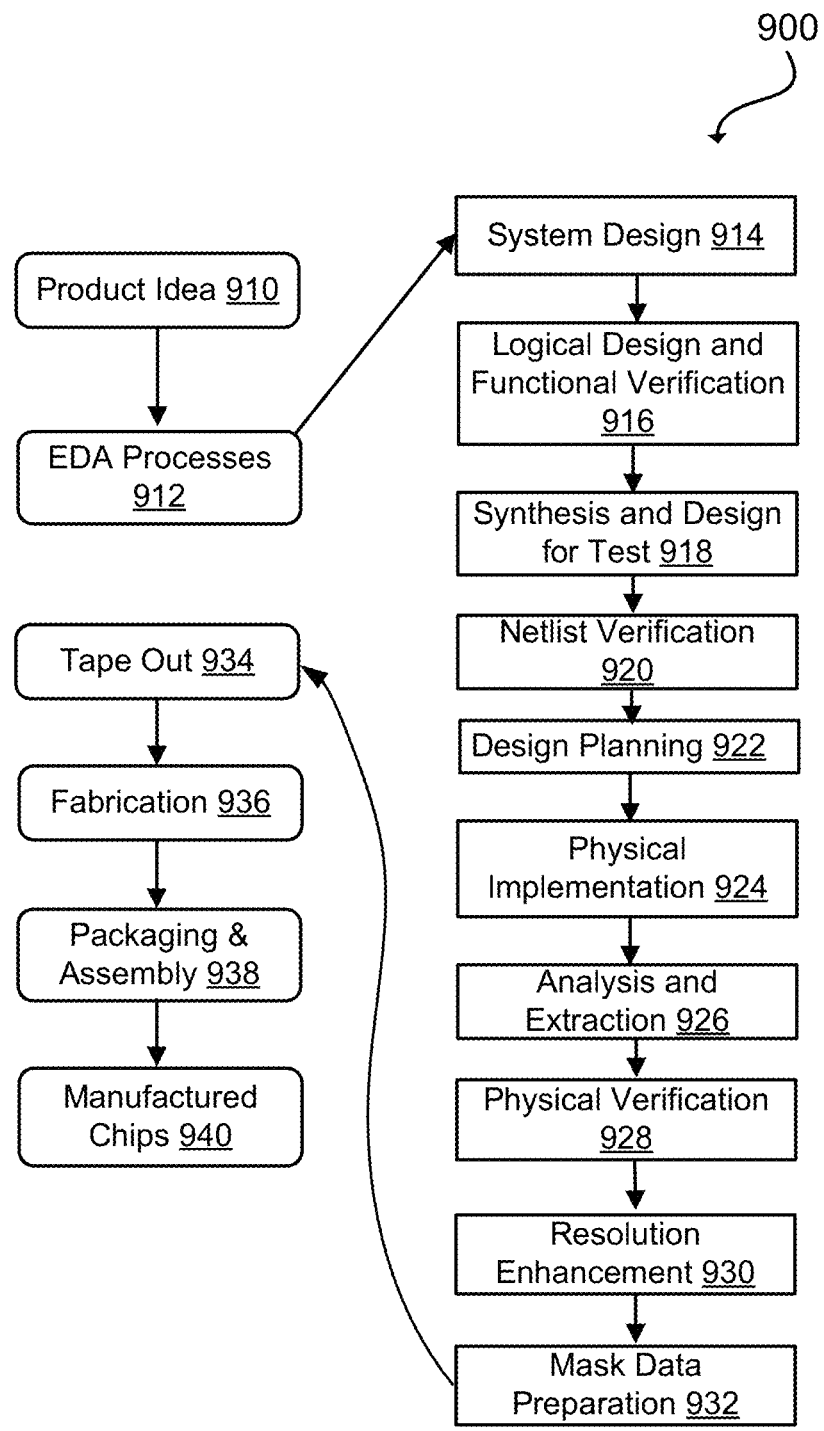
FIG. 9 illustrates a flow-chart of various processes used during the design and fabrication of an integrated circuit in accordance with some embodiments.

FIG. 9 illustrates an example set of processes 900 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 910 with information supplied by a designer, information which is transformed to create an article of manufacture that uses a set of EDA processes 912. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 936 and packaging and assembly processes 938 are performed to produce the finished integrated circuit 940.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 9. The processes described by be enabled by EDA products (or tools).

During system design 914, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 916, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 918, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 920, the netlist is checked for compliance with timing constraints and for correspondence with the HDL code. During design planning 922, an overall floor plan for the integrated circuit is constructed and analyzed for timing and top-level routing.

During layout or physical implementation 924, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 926, the circuit function is verified at the layout level, which permits refinement of the layout design. During physical verification 928, the layout design is checked to ensure that manufacturing constraints are correct, such as DRC constraints, electrical constraints, lithographic constraints, and that circuitry function matches the HDL design specification. During resolution enhancement 930, the geometry of the layout is transformed to improve how the circuit design is manufactured.

During tape-out, data is created to be used (after lithographic enhancements are applied if appropriate) for production of lithography masks. During mask data preparation 932, the 'tape-out' data is used to produce lithography masks that are used to produce finished integrated circuits.

A storage subsystem of a computer system (such as computer system 1100 of FIG. 11, or host system 1007 of FIG. 10) may be used to store the programs and data structures that are used by some or all of the EDA products described herein, and products used for development of cells for the library and for physical and logical design that use the library.

Figure 10:
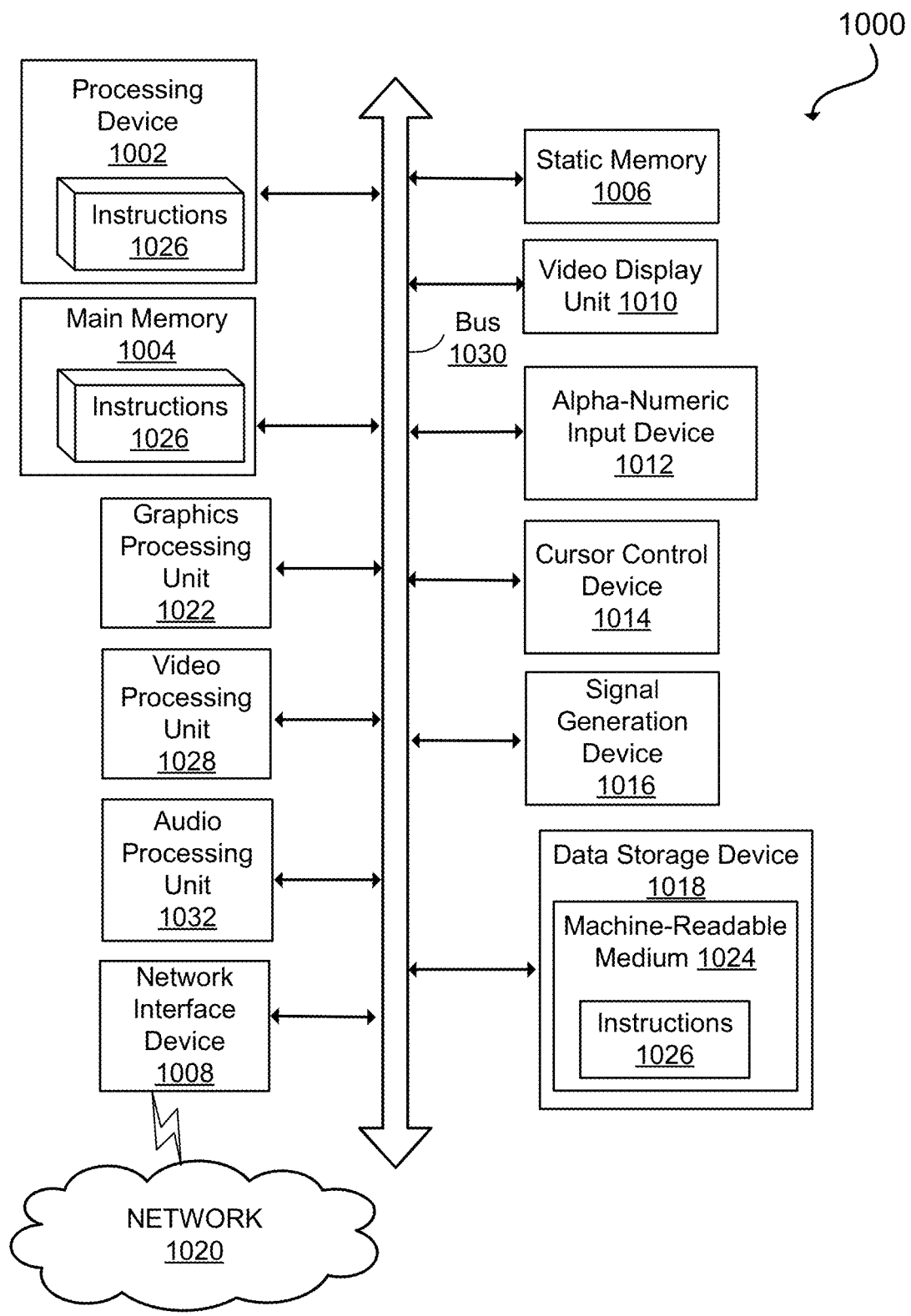
FIG. 10 illustrates a diagram of an example computer system in which embodiments of the present disclosure may operate.

FIG. 10 illustrates an example machine of a computer system 1000 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in a client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM), a static memory 1006 (e.g., flash memory, static random access memory (SRAM), etc.), and a data storage device 1018, which communicate with each other via a bus 1030.

Processing device 1002 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 may also be one or more special-purpose processing devices such as an application-specific integrated circuit (ASIC), a field-programmable gate array (FPGA), a digital signal processor (DSP), network processor, or the like. The processing device 1002 may be configured to execute instructions 1026 for performing the operations and steps described herein.

The computer system 1000 may further include a network interface device 1108 to communicate over the network 1020. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), a graphics processing unit 1022, a signal generation device 1016 (e.g., a speaker), graphics processing unit 1022, video processing unit 1028, and an audio processing unit 1032.

The data storage device 1018 may include a machine-readable storage medium 1024 (also known as a non-transitory computer-readable medium) on which is stored one or more sets of instructions 1026 or software embodying any one or more of the methodologies or functions described herein. The instructions 1026 may also reside, completely or at least partially, within the main memory 904 and/or within the processing device 1002 during execution thereof by the computer system 1000, the main memory 1004, and the processing device 1002 also constituting machine-readable storage media.

In some implementations, instructions 1026 include instructions to implement functionality corresponding to the present disclosure. While the machine-readable storage medium 1024 is shown in an example implementation to be a single medium, the term "machine-readable storage medium" should be taken to include a single medium or multiple media (e.g., a centralized or distributed database and/or associated caches and servers) that store the one or more sets of instructions. The term "machine-readable storage medium" shall also be taken to include any medium that is capable of storing or encoding a set of instructions for execution by the machine and that cause the machine and the processing device 1002 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to the desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system or similar electronic computing device that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product or software that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as read-only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader scope of implementations of the disclosure as set forth in the following claims. The disclosure refers to some elements in the singular tense, more than one element can be depicted in the figures, and like elements are labeled with like numerals. The disclosure and drawings are, accordingly, to be regarded in an illustrative sense rather than a restrictive sense.

What is claimed is:

1. A method, comprising:
    generating, by one or more processors, an impedance map specifying impedances at a plurality of frequencies corresponding to one or more port-pairs of a circuit component to extract a plurality of impedance values between the one or more port-pairs based on a first value for each parameter of a plurality of parameters of the circuit component, wherein the one or more port-pairs and the plurality of frequencies corresponding to the one or more port-pairs are specified in a first circuit representation model;
    generating, by the one or more processors, a second circuit representation model based on updating the plurality of impedance values between the one or more port-pairs based on a second value for one or more parameters of the plurality of parameters of the circuit component, the second circuit representation model having a smaller size than the first circuit representation model; and
    updating, by the one or more processors, the second circuit representation model by tuning the updated plurality of impedance values between the one or more port-pairs based on a use context of the circuit component in a circuit.

2. The method of claim 1, wherein the plurality of parameters comprises one or more of a ladder depth range, a section count range, symmetricity of the circuit component, and enabling of a bypass or bridge capacitance optimization.

3. The method of claim 1, wherein the plurality of parameters comprise a structure type of the circuit component, the structure type specified as a passive component.

4. The method of claim 3, wherein the passive component comprises a resistor, an inductor, or a capacitor.

5. The method of claim 1, wherein the updating the second circuit representation model further comprises:
    estimating, by the one or more processors, initial values of one or more of the plurality of parameters of the circuit component for the one or more port-pairs based on the generated impedance map;
    generating, by the one or more processors, a plurality of parameter vectors by iterating a plurality of parameters for each of a plurality of ladder diagrams corresponding to each of a plurality of segments between a port-pair of the one or more port-pairs, wherein each of the plurality of parameter vectors generates a different configuration for a circuit network of the second circuit representation model; and
    comparing, by the one or more processors, impedances of the circuit network between each of the one or more port-pairs for each generated different configuration of the circuit network at each of the plurality of frequencies against the impedances of the impedance map of the first circuit representation model to generate the second circuit representation model of the circuit component between each of the one or more port pairs.

6. The method of claim 5, further comprising:
    generating, by the one or more processors, a linearized model of the use context of the circuit component in the circuit;
    connecting, by the one or more processors, the second circuit representation model of the circuit component with the linearized model of the use context of the circuit component in the circuit; and
    performing, by the one or more processors, simulation-based iterations on the second circuit representation model to minimize differences between the second circuit representation model and the first circuit representation model.

7. The method of claim 5, further comprising:
determining, by the one or more processors, an interaction between two parameters of the plurality of parameters of the circuit component; and
optimizing, by the one or more processors, a mutual coefficient based on the determined interaction between the two parameters.

8. The method of claim 1, wherein the updating the plurality of impedance values is performed using a gradient-descent method.

9. A system, comprising:
a memory configured to store operations; and
one or more processors configured to perform the operations, the operations comprising:
generating an impedance map specifying impedances at a plurality of frequencies corresponding to one or more port-pairs of a circuit component to extract a plurality of impedance values between the one or more port-pairs based on a first value for each parameter of a plurality of parameters of the circuit component, wherein the one or more port-pairs and the plurality of frequencies corresponding to the one or more port-pairs are specified in a first circuit representation model,
generating a second circuit representation model based on updating the plurality of impedance values between the one or more port-pairs based on a second value for one or more parameters of the plurality of parameters of the circuit component, the second circuit representation model having a smaller size than the first circuit representation model; and
updating the second circuit representation model by tuning the updated plurality of impedance values between the one or more port-pairs based on a use context of the circuit component in a circuit.

10. The system of claim 9, wherein the plurality of parameters comprises one or more of a ladder depth range, a section count range, symmetricity of the circuit component, and enabling of a bypass or bridge capacitance optimization.

11. The system of claim 10, wherein the plurality of parameters comprise a structure type of the circuit component, the structure type specified as a passive component.

12. The system of claim 11, wherein the passive component comprises a resistor, an inductor, or a capacitor.

13. The system of claim 9, wherein for the updating the second circuit representation model, the operations further comprise:
estimating initial values of one or more of the plurality of parameters of the circuit component for the one or more port-pairs based on the generated impedance map;
generating a plurality of parameter vectors by iterating a plurality of parameters for each of a plurality of ladder diagrams corresponding to each of a plurality of segments between a port-pair of the one or more port-pairs, wherein each of the plurality of parameter vectors generates a different configuration for a circuit network of the second circuit representation model; and
comparing impedances of the circuit network between each of the one or more port-pairs for each generated different configuration of the circuit network at each of the plurality of frequencies against the impedances of the impedance map of the first circuit representation model to generate the second circuit representation model of the circuit component between each of the one or more port pairs.

14. The system of claim 13, wherein the operations further comprise:
generating a linearized model of the use context of the circuit component in the circuit;
connecting the second circuit representation model of the circuit component with the linearized model of the use context of the circuit component in the circuit; and
performing simulation-based iterations on the second circuit representation model to minimize differences between the second circuit representation model and the first circuit representation model.

15. The system of claim 13, wherein the operations further comprise:
determining an interaction between two parameters of the plurality of parameters of the circuit component; and
optimizing a mutual coefficient based on the determined interaction between the two parameters.

16. The system of claim 9, wherein the updating the plurality of impedance values is performed using a gradient-descent method.

17. A non-transitory, tangible computer-readable device having instructions stored thereon that, when executed by at least one computing device, causes the at least one computing device to perform operations comprising:
generating an impedance map specifying impedances at a plurality of frequencies corresponding to one or more port-pairs of a circuit component using a circuit simulator to extract a plurality of impedance values between the one or more port-pairs pairs based on a first value for each parameter of a plurality of parameters of the circuit component, wherein the one or more port-pairs and the plurality of frequencies corresponding to the one or more port-pairs are specified in a first circuit representation model,
generating a second circuit representation model based on updating the plurality of impedance values between the one or more port-pairs based on a second value for one or more parameters of the plurality of parameters of the circuit component, the second circuit representation model having a smaller size than the first circuit representation model, and
updating the second circuit representation model by tuning the updated plurality of impedance between the one or more port-pairs based on a use context of the circuit component in a circuit.

18. The non-transitory, tangible computer-readable device of claim 17, wherein the plurality of parameters comprises one or more of a ladder depth range, a section count range, symmetricity of the circuit component, and enabling of a bypass or bridge capacitance optimization.

19. The non-transitory, tangible computer-readable device of claim 18, wherein the plurality of parameters comprise a structure type of the circuit component, the structure type specified as a passive component.

20. The non-transitory, tangible computer-readable device of claim 19, wherein the passive component comprises a resistor, an inductor, or a capacitor.

* * * * *